United States Patent [19]

Nakamura et al.

[11] Patent Number: 4,918,159

[45] Date of Patent: Apr. 17, 1990

[54] STYRENE-BASED/POLYMERCAPTAN POLYMER AND PROCESS FOR PRODUCTION THEREOF

[75] Inventors: Shinichi Nakamura; Hideo Teshima; Eiichi Terada, all of Ichihara, Japan

[73] Assignee: Idemitsu Petrochemical Co., Ltd., Tokyo, Japan

[21] Appl. No.: 237,982

[22] Filed: Aug. 29, 1988

[30] Foreign Application Priority Data

Sep. 24, 1987 [JP] Japan ................................ 62-237297
Jul. 1, 1988 [JP] Japan ................................ 63-162428

[51] Int. Cl.$^4$ ............................................. C08G 75/04
[52] U.S. Cl. ................................... 528/376; 528/322; 528/362; 528/364; 528/392
[58] Field of Search ................ 528/376, 322, 392, 362, 528/364

[56] References Cited

U.S. PATENT DOCUMENTS 3,832,421 8/1974 Morgan ................................ 528/376
3,983,057 9/1976 Illmann et al. ..................... 260/29.6
4,740,573 4/1988 Eichenauer et al. ................ 526/224

FOREIGN PATENT DOCUMENTS 228540 11/1985 Japan .................................. 528/376

Primary Examiner—Harold D. Anderson
Attorney, Agent, or Firm—Frishauf, Holtz, Goodman & Woodward

[57] ABSTRACT

Novel styrene-based polymers and a process for efficient production thereof are disclosed. The styrene-based polymers have a branching nucleus represented by the general formula: $R\text{-}(S\text{-})_k$ or $R\text{-}(A\text{-}S\text{-})_k$ (wherein all the symbols are as defined in the appended claims), and have a sulfur content of 6 to 550 ppm, a weight average molecular weight of 450,000 to 1,300,000, and a weight average molecular weight/number average molecular weight (Mw/Mn) ratio of 2:1 to 15:1. The styrene-based polymers are greatly improved in impact resistance while maintaining sufficiently high fluidity and moldability and thus when injection or extrusion molded, can provide moldings having an excellent mechanical strength.

25 Claims, 1 Drawing Sheet

STYRENE-BASED/POLYMERCAPTAN POLYMER AND PROCESS FOR PRODUCTION THEREOF

BACKGROUND OF THE INVENTION

1. Field of the Invention

The present invention relates to styrene-based polymers and a process for production thereof. More particularly, it is concerned with novel styrene-based polymers which have a branching nucleus containing a sulfur atom and further which have specified sulfur content, molecular weight and molecular weight distribution, and a process for efficiently producing the styrene-based polymers.

2. Description of Related Art

The impact resistance of styrene-based polymers can be improved by increasing the molecular weight thereof. In general, however, if the molecular weight is increased, fluidity will drop and, therefore, residual strain, etc. are increased in molding and no good molding can be obtained.

In order to increase the fluidity of the polymer, it is considered to raise the molding temperature, or decrease the molecular weight, or add an internal lubricant. Raising the molding temperature, however, is accompanied by a problem that the resulting molding is subject to thermal deterioration and colored in yellow. If the molecular weight is decreased, mechanical properties such as impact resistance and so forth are reduced, and if the internal lubricant is added, heat resistance is decreased.

Under such circumstances, it has been desired to develop a technique to improve the impact resistance of styrene-based polymers without deteriorating the fluidity thereof.

It is known that so-called styrene-based star polymers are obtained by anion-polymerizing styrene-based polymers by the use of a polymerization initiator, e.g., metallic lithium (see, for example, J. Polym. Sci. PART, A 3, 681–696 (1965)). Styrene-based star polymers produced by the anionic polymerization, however, have such a narrow molecular weight distribution that the weight average molecular weight/number average molecular weight (Mw/Mn) is about 1:1, and further have a disadvantage in that if the molecular weight is increased, moldability will be seriously reduced.

A method of producing styrene-based star polymers by radical polymerizing styrene-based monomers is described in Makcromol. Chem., 178, 1427 (1977). In this publication, however, only the mechanism of the reaction is studied, and the conversions of the polymers obtained are at most 25%. That is, there is found no description concerning styrene-based star polymers obtained by radical polymerizing at a conversion in excess of 25%. There is also no description concerning the physical properties and moldability of the styrene-based star polymers obtained. The present inventors' investigation has revealed that the styrene-based star polymers obtained by the method disclosed in the above publication do not have satisfactory physical properties and moldability.

SUMMARY OF THE INVENTION

The present invention is intended to overcome the above problems and an object of the present invention is to provide styrene-based polymers which are improved in impact resistance without deteriorating the fluidity thereof.

It has been found that if styrene-based monomers are radical polymerized in the presence of a specified polyfunctional mercaptan compound until the conversion is at least 40% to increase the molecular weight, novel styrene-based polymers greatly improved in impact resistance while maintaining sufficiently high fluidity can be obtained.

The present invention relates to styrene-based polymers which have a branching nucleus represented by the general formula:

$$R(-S)_k \text{ or } R(-A-S)_k \quad (I)$$

(wherein R is an alkyl radical having 1 to 10 carbon atoms or an aryl radical having 6 to 10 carbon atoms, A is an organic radical, S is a sulfur atom, and k is 3 or 4, provided all of three or four —S or —A—S are bonded to R), and which have a sulfur content of 6 to 550 ppm, a weight average molecular weight of 450,000 to 1,300,000, and a weight average molecular weight/number average molecular weight ratio (Mw/Mn) of 2 to 15.

The present invention relates to a process for producing the above styrene-based polymers which comprises radical polymerizing styrene-based monomers, or styrene-based monomers and other monomers copolymerizable therewith by the use of 25 to 2,000 ppm based on the total weight of the monomers used of a polyfunctional mercaptan compound represented by the general formula:

$$R(-SH)_k \text{ or } R(-A-SH)_k \quad (II)$$

(wherein R, A and k are the same as above) until the conversion reaches at least 40% by weight.

DESCRIPTION OF PREFERRED EMBODIMENTS

Figure 1:
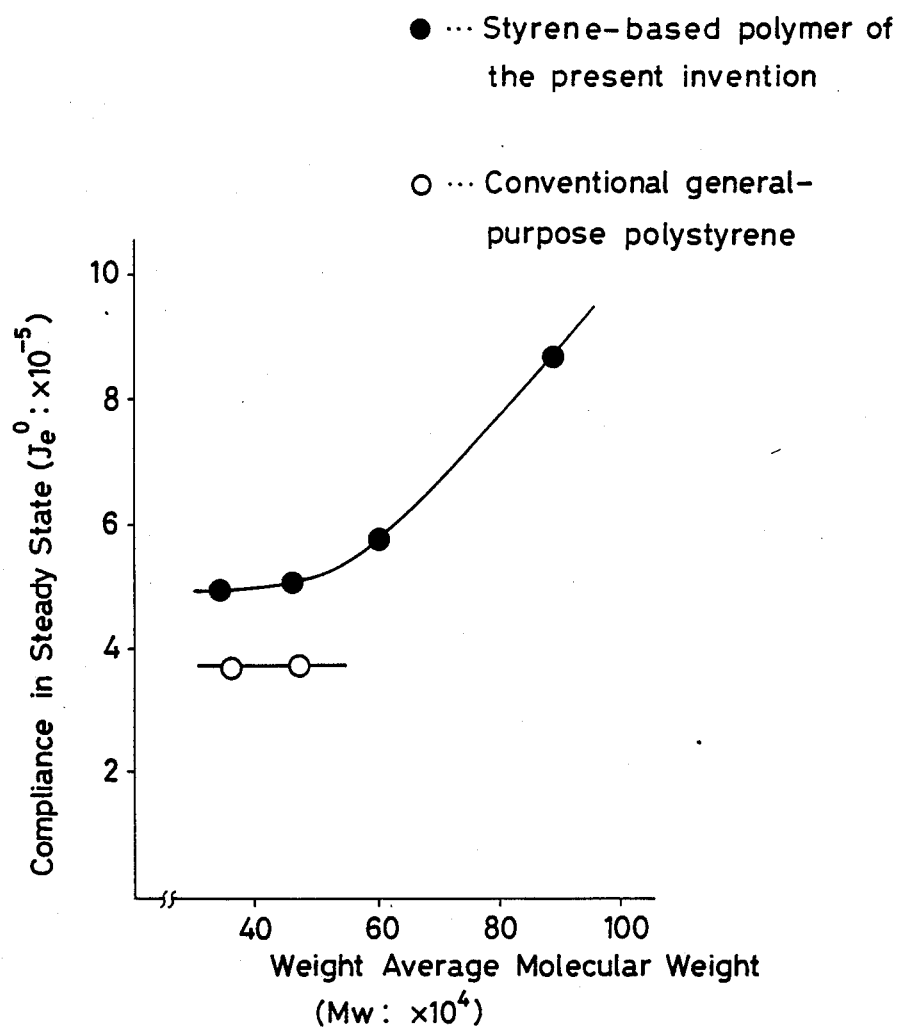
FIG. 1 shows a relation between compliance in the steady state and molecular weight of a styrene-based polymer of the present invention and also of a conventional linear styrene-based polymer.

The styrene-based polymers of the present invention can be produced by various methods. It is preferred, however, that they be produced by the process of the present invention.

The process of the present invention will hereinafter be explained.

Styrene-based monomers which can be used in the present invention include, as well as styrene, α-substituted alkylstyrene such as α-methylstyrene, α-ethylstyrene, α-isopropylstyrene and the like, nucleus-substituted alkylstyrene such as p-methylstyrene, m-methylstyrene, 2,5-dimethylstyrene and the like, and nucleus-substituted halogenated styrene such as p-chlorostyrene, p-bromostyrene and the like.

Although the styrene-based monomers may be polymerized by themselves, they can be polymerized in combination with other monomers copolymerizable therewith. Other monomers which can be used include vinyl monomers such as acrylonitrile, methacrylonitrile, methacrylic acid, methyl methacrylate, acrylic acid, methyl acrylate and the like, maleic anhydride, maleimide, N-phenyl maleimide, and the like.

Thus the styrene-based polymers of the present invention include, as well as homopolymers or copolymers (random copolymers, graft copolymers, etc.) of styrene-based monomers as described above, copolymers of styrene-based monomers and other monomers copolymerizable therewith.

In the process of the present invention, a polyfunctional mercaptan compound represented by the above general formula (II) is added before or during polymerization in a amount of 25 to 2,000 ppm based on the total weight of the monomers used, and the polymerization is carried out in the presence of the polyfunctional mercaptan compound.

In the general formula (II), R is an alkyl radical having 1 to 10 carbon atoms or an aryl radical having 6 to 10 carbon atoms. The alkyl radical having 1 to 10 carbon atoms is a radical resulting from the removal of hydrogen atoms from the alkyl group depending on the number (k) of —S or —A—S bonded. Examples are groups resulting from the removal of 2 or 3 hydrogen atoms from, for example, a methyl group, an ethyl group, a propyl group, an isopropyl group, a butyl group, and a tert-butyl group. The aryl radical having 6 to 10 carbon atoms is a group resulting from the removal of 2 or 3 hydrogen atoms from, for example, a phenyl group, a nucleus-substituted phenyl group (e.g., a tolyl group), an α-naphthyl group, and a β-naphthyl group. A represents, for example, an organic radical represented by the general formula:

$$-(CH_2)_m-O-\underset{\underset{O}{\|}}{C}-(CH_2)_n- \qquad (III)$$

(wherein m is an integer of 0 to 10, and n is an integer of 1 to 10). In the general formula (II), all of three or four —SH or —A—SH are bonded to R.

Various polyfunctional mercaptan compounds can be used in the present invention. Representative examples of four functional mercaptan compounds are
pentaerythritol tetraquis(2-mercaptoethanate),
pentaerythritol tetraquis(3-mercaptopropionate),
pentaerythritol tetraquis(4-mercaptobutanate),
pentaerythritol tetraquis(5-mercaptopentanate),
pentaerythritol tetraquis(6-mercaptohexanate) and the like.
Representative examples of three functional mercaptan compounds are trimethylolpropane tris(2-mercaptoethanate),
trimethylolpropane tris(3-mercaptopropionate),
trimethylolpropane tris(4-mercaptobutanate),
trimethylolpropane tris(5-mercaptopentanate),
trimethylolpropane tris(6-mercaptohexanate) and the like.
These polyfunctional mercaptan compounds can be used alone or in combination with each other.

The amount of the polyfunctional mercaptan compound used is chosen within the range of 25 to 2,000 ppm based on the total weight of monomers used. If the amount of the polyfunctional mercaptan compound used is less than 25 ppm, the sulfur content of the resulting styrene-based polymer is less than 6 ppm and the impact strength is not increased because the molecular weight is not sufficiently increased. On the other hand, if it is in excess of 2,000 ppm, the sulfur content of the resulting styrene-based polymer is more than 550 ppm, and since the molecular weight is excessively increased, fluidity and moldability are reduced. If the temperature is raised in order to improve the fluidity and moldability, the molecular weight is excessively decreased, and mechanical strength such as impact strength of the resulting molding drops. Thus it is preferred that the polyfunctional mercaptan compound be used in an amount of 100 to 1,500 ppm based on the total weight of monomers used.

Radical polymerization of styrene-based monomers, or styrene-based monomers and other monomers copolymerizable therewith can be carried out by known techniques such as suspension polymerization, bulk-suspension two stage polymerization, bulk polymerization, by the use of a polymerization initiator, e.g., benzoyl peroxide, dicumyl peroxide, tertbutylperoxy isopropylcarbonate, 2,4-dichlorobenzoyl peroxide, and cumene hydroperoxide, usually under atmospheric pressure at a polymerization temperature of about 70° to 150° C. In the radical polymerization, various additives such as a suspension stabilizer, as commonly used in the polymerization of this type can be used. In order to more increase the impact resistance of the resulting styrene-based polymers, a rubber-like substance such as polybutadiene may be dissolved in the starting monomer materials, or after polymerization, the rubber-like substance may be incorporated in the polymers by kneading. Rubber-like substances which can be used include diene-based rubbers such as polybutadiene rubber, acrylonitrile-butadiene copolymer rubber (NBR), styrene-butadiene copolymer rubber (SBR), acrylbased rubbers such as polybutyl acrylate, polypropyl acrylate, and the like. In addition, ethylene-propylenediene-based rubber (EPDM) and the like can be used.

In the process of the present invention, the radical polymerization is carried out until the conversion reaches at least 40% and preferably at lease 60%. If the conversion is less than 40%, the desired high molecular weight styrene-based polymer cannot be obtained and thus the impact resistance is not sufficiently improved. Maintaining the initial polymerization temperature at 85° to 95° C. is effective to obtain styrene-based polymers having the above specified weight average molecular weight (Mw) and molecular weight distribution (Mw/Mn).

The sulfur content of the styrene-based polymer was measured by the fluorescent X-ray analysis as described hereinafter. It was found that the amount of the mercaptan compound contained as calculated from the above sulfur content was equal to the amount of the mercaptan compound used. The styrene-based polymer was dissolved in chloroform and then precipitated by adding methanol. In the electric titration analysis of the methanol portion, no sulfur was detected. From the above results, it is considered that almost all of the mercaptan compound added is incorporated in the polymer chain of the styrene-based polymer obtained by the process of the present invention.

The compliance in the steady state was determined from the melt viscoelasticity of the styrene-based polymer obtained. The melt viscoelasticity was measured by the use of a cone-disc type rheometer having a diameter of 2.5 cm and a cone angle of 0.1 rad, under conditions of temperature 230° C., strain 10% and angular speed of 600 to $1 \times 10^2$ (ω)rad/sec. The compliance in the steady state ($J_e^0$) was determined by the following equation:

$$J_e^0 = \lim_{\omega \to o} \frac{AG}{\eta_0^2}$$

where $$AG \text{ (elasticity constant)} = \lim_{\omega \to 0} (G'/\omega^2)$$

$$\eta_0 \text{ (zero shear viscosity)} = \lim_{\omega \to 0} (G''/\omega)$$

$G'$ = storage elastic modulus
$G''$ = loss elastic modulus
(both at $10^{-2}$ rad/sec).

In FIG. 1, the compliance in the steady state (determined by the aforementioned method) and molecular weight of a styrene-based polymer obtained using pentaerythritol tetraquis(3-mercaptopropionate) as a four functional mercaptan compound are plotted. As apparent from FIG. 1, the compliance in the steady state does not become constant, which confirms that the styrene-based is a branched polymer. It is known that the usual linear styrene polymer has an almost constant compliance in the steady state. In fact, as apparent from FIG. 1, the compliance in the steady state of the usual linear styrene polymer is constant.

Thus it was confirmed that in accordance with the process fo the present invention, when a three functional mercaptan compound, for example, was used, there was formed a styrene-based polymer (branched polymer) containing as the center (branching nucleus) the three functional mercaptan compound radical of the general formula (I) as schematially illustrated below.

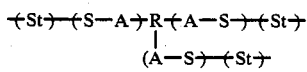

(wherein St represents a styrene-based monomer unit).

The sulfur content of the styrene-based polymer of the present invention is in correlation with the amount of the polyfunctional mercaptan compound of the general formula (II) used, and is from 6 to 550 ppm. If the sulfur content is less than 6 ppm or more than 550 ppm, undesirable problems as described in connection with the amount of the polyfunctional mercaptan compound used arise. Particularly preferably the sulfur content is in the range of 20 to 500 ppm.

The weight average molecular weight of the styrene-based polymer of the present invention is 450,000 to 1,300,000 and preferably 500,000 to 1,200,000. If the weight average molecular weight is less than 450,000, impact resistance is not improved. On the other hand, if it is more than 1,300,000, fluidity drops and moldability is reduced.

The weight average molecular weight/number average molecular weight (Mw/Mn) ratio is 2 to 15 and preferably 2.5 to 13. If the ratio is less than 2, moldability is reduced. On the other hand, if it is more than 15, super high molecular weight polymers and low molecular weight polymers are formed, leading to a reduction in fluidity and further to a reduction in impact strength.

As described above, the styrene-based polymers of the present invention are greatly improved in impact resistance while maintaining their high fluidity and moldability. The flatwise impact strength of the styrene-based polymer of the present invention is about 26 kg cm/cm while that of the conventional general-purpose polystyrene (GPPS) is 12 kg cm/cm. Thus the styrene-based polymers of the present invention, when injection molded or extrusion molded, provide moldings having excellent mechanical strength. The styrene-based polymers of the present invention can be produced greatly efficiently by the process of the present invention.

Thus the styrene-based polymers of the present invention can be widely and effectively utilized as materials for injection molding, extrusion molding or sheet molding.

The present invention is described in greater detail with reference to the following examples. All % and ppm are by weight. The sulfur content, molecular weight, molecular weight distribution, melt index (MI), conversion and impact strength of the styrene-based polymer obtained were measured by the following methods.

Sulfur Content

A polymer was pressed and the sulfur content was measured using fluorescent X-rays.

Weight Average Molecular Weight (Mw) and Molecular Weight Distribution (Mw/Mn)

Measured by gel permeation chromatography (GPC) using monodisperse polystyrene as a molecular weight standard sample (produced by Pressure Chemical Corp.).

Melt Index (MI)

Measured according to JIS K7210

Conversion

The amount of residual monomers in the polymer was measured by gas chromatography, and the conversion was calculated from the amount of reacted monomers.

Impact Strength

The flatwise impact strength (not notched) was measured according to JIS-K7110 (1/8 inch molding, molding temperature 230° C.).

EXAMPLE 1

A styrene monomer solution containing 0.2% of benzoyl peroxide, 0.25% of tert-butylperoxyisopropyl carbonate, and 50 ppm of pentaerythritol tetraquis(3-mercaptopropionate), and ion-exchanged water containing 1% (based on the weight of water) of calcium triphosphate and 0.05% (based on the weight of water) of sodium dodecylbenzenesulfonate as suspension stabilizers were placed in a 10-liter polymerization vessel with a stirrer in a volume ratio of 1:2. Polymerization was performed with stirring at 500 rpm in a nitrogen atmosphere for 6 hours at 90° C., for 4 hours at 110° C. and further for 4 hours at 120° C. The results are shown in Table 1.

EXAMPLE 2

Polymerization was performed in the same manner as in Example 1 except that 300 ppm of trimethylolpropane tris(3-mercaptopropionate) was added as the polyfunctional mercaptan compound. The results are shown in Table 1.

EXAMPLE 3

Polymerization was performed in the same manner as in Example 1 except that the pentaerythritol tetraquis (3-mercaptopropionate) was added in an amount of 1,000 ppm and the temperature was 100° C. in place of 90° C. The results are shown in Table 1.

EXAMPLE 4

Polymerization was performed in the same manner as in Example 1 except that 1,800 ppm of trimethylolpropane tris (3-mercaptopropionate) was added as the polyfunctional mercaptan compound and the temperature was 100° C. in place of 90° C. The results are shown in Table 1.

EXAMPLE 5

Polymerization was performed in the same manner as in Example 1 except that 400 ppm of pentaerythritol tetraquis (3-mercaptopropionate) was added as the polyfunctional mercaptan compound. The polymerization was stopped when the conversion reached 82%. The results are shown in Table 1.

EXAMPLE 6

Eight % by weight of polybutadiene rubber was completely dissolved in the styrene monomer solution of Example 1. The resulting solution was placed in a 5-liter bulk polymerization vessel equipped with a double helical blade and polymerized with stirring at 500 rpm in a nitrogen atmosphere for 8 hours at 90° C. to produce a prepolymer.

The prepolymer and ion-exchanged water with 0.2% (based on the weight of water) of polyvinyl alcohol as a suspension stabilizer dissolved therein were placed in a 10-liter suspension polymerization vessel in a volume ratio of 1:2, and reacted at 500 rpm in a nitrogen atmosphere for 4 hours at 90° C., for 4 hours at 110° C. and further for 4 hours at 120° C.

EXAMPLE 7

Polymerization was performed in the same manner as in Example 1 except that 2,800 ppm of trimethylolpropane tris (3-mercaptopropionate) was added as the polyfunctional mercaptan compound and the temperature was 100° C. in place of 90° C. The polymerization was stopped at a conversion of 75%. The results are shown in Table 1.

EXAMPLE 8

A styrene monomer solution containing 250 ppm of 1,1-(tert-butylperoxy)3,3,5-trimethylcyclohexane, 150 ppm of pentaerythritol tetraquis(3-mercaptopropionate) and 700 ppm of an antioxidant (trade name Irganox 1076, produced by Ciba Geigy Corp.) was continuously introduced at a rate of 4 liters per hour in a 13-liter volume first polymerization vessel, and polymerized.

Pentaerythritol tetraquis(3-mercaptopropionate) was added to the above polymer at a rate of 0.004 liter per hour, and the resulting mixture was sent to a 19-liter volume second polymerization vesesl and then to a 20-liter third polymerization vessel, in which polymerization was continued at a temperature of 110° to 180° C. Then, volatile components were removed by the use of an evaporation apparatus, and a polystyrene resin in the form of pellets was obtained.

The amount of solids before the evaporation was 78%. The results are shown in Table 1.

EXAMPLE 9

Polymerization was performed in the same manner as in Example 1 except that 1,000 ppm of pentaerythritol tetraquis (3-mercaptopropionate) was added, and the polymerization at 110° C. was omitted and the temperature at the final polymerization stage was change from 120° C. to 135° C. The results are shown in Table 1.

COMPARATIVE EXAMPLE 1

Polymerization was performed in the same manner as in Example 5 except that 400 ppm of pentaerythritol tetraquis (3-mercaptopropionate) was added, and the reaction was stopped in the state that the polymerization was performed for 4 hours at 90° C. The results are shown in Table 1.

COMPARATIVE EXAMPLE 2

Polymerization was performed in the same manner as in Example 1 except that 2,500 ppm of trimethylolpropane tris (3-mercaptopropionate) was added and 0.3% by weight of benzoyl peroxide was added. The results are shown in Table 1.

COMPARATIVE EXAMPLE 3

A styrene monomer solution containing 480 ppm of azobisisobutylonitirile (AIBN) and 8,900 ppm of neopentene tetrayl tetraquis(2-mercaptoacetate) was placed in a 10-liter polymerization vessel equipped with a stirrer and polymerized in a nitrogen atmosphere for 16 hours at 60° C. The results are shown in Table 1.

COMPARATIVE EXAMPLE 4

Polymerization was performed in the same manner as in Comparative Example 3 except that the polymerization temperature was 65° C. in place of 60° C. The results are shown in Table 1.

COMPARATIVE EXAMPLE 5

Polymerization was performed in the same manner as in Example 1 except that the mercaptan was not added and the polymerization time at 90° C. was 12 hours in place of 6 hours. The results are shown in Table 1.

COMPARATIVE EXAMPLE 6

Polymerization was performed in the same manner as in Example 1 except that 2,800 ppm of trimethylolpropane tris (3-mercaptopropionate) was added and the polymerization temperature was 100° C. in place of 90° C. The polymerization was stopped at a conversion of 90%. The results are shown in Table 1.

COMPARATIVE EXAMPLE 7

Polymerization was performed in the same manner at in Example 1 except that 1,000 ppm of pentaerythritol tetraquis (3-mercaptopropionate) was added, and after the polymerization for 3 hours at 90° C., the temperature was raised to 135° C. at a rate of 25° C. per hour and the polymerization was performed for 6 hours at 135° C. The results are shown in Table 1.

COMPARATIVE EXAMPLE 8

10 parts by weight of a n-hexane solution containing 0.07% by weight of n-butyl lithium and 20 parts by weight of a n-hexane solution containing 50% by weight of styrene were placed in a 10-liter polymerization vessel equipped with a stirrer, and anionic polymerization was performed in a nitrogen atmosphere at 80° C. for 5 hours while stirring at 300 rpm. Then, ¼ mol per mol of n-butyl lithium of silicon tetra-chloride was added to the above polymerization solution, and anionic polymerization was performed at 100° C. for 1 hour to obtain a four-branched polystyrene solution. The polystyrene was isolated by distilling away the solvent. The results are shown in Table 1.

TABLE 1

| No. | Mercaptan 3-Functional *1 | Mercaptan 4-Functional *2 | Conversion (wt %) | Weight Average Molecular Weight | Molecular Weight Distribution | MI (g/10 min) | Impact Strength (kg cm/cm) | Sulfur Content (ppm) |
|---|---|---|---|---|---|---|---|---|
| Example 1 | 0 | 50 | 100 | $45 \times 10^4$ | 3.9 | 3.2 | 18 | 13 |
| Example 2 | 300 | 0 | 100 | $58 \times 10^4$ | 5.1 | 2.1 | 20 | 72 |
| Example 3 | 0 | 1000 | 100 | $82 \times 10^4$ | 9.8 | 0.9 | 23 | 262 |
| Example 4 | 1800 | 0 | 100 | $95 \times 10^4$ | 12.5 | 0.6 | 26 | 434 |
| Example 5 | 0 | 400 | 82 | $89 \times 10^4$ | 9.4 | 0.8 | 24 | 105 |
| Example 6 | 0 | 50 | 100 | $47 \times 10^4$ | 4.3 | 2.1 | 51 | 13 |
| Example 7 | 2000 | 0 | 75 | $119 \times 10^4$ | 2.6 | 0.4 | 32 | 536 |
| Example 8 | 0 | 250 | 78 | $61 \times 10^4$ | 2.7 | 2.1 | 20 | 83 |
| Example 9 | 0 | 1000 | 100 | $60 \times 10^4$ | 13.0 | 1.7 | 28 | 262 |
| Comparative Example 1 | 0 | 400 | 25 | $13 \times 10^4$ | 4.5 | 150 | 5 | 105 |
| Comparative Example 2 | 2500 | 0 | 100 | $125 \times 10^4$ | 16.4 | 0.1 | 22 | 603 |
| Comparative Example 3 | 0 | 8900*3 | 22 | $39 \times 10^4$ | 6.6 | 3.3 | 12 | 11990 |
| Comparative Example 4 | 0 | 8900*3 | 28 | $22 \times 10^4$ | 6.9 | 4.3 | 10 | 9420 |
| Comparative Example 5 | 0 | 0 | 100 | $46 \times 10^4$ | 2.4 | 2.5 | 11 | 0 |
| Comparative Example 6 | 2800 | 0 | 90 | $140 \times 10^4$ | 7.1 | 0.1 | 20 | 750 |
| Comparative Example 7 | 0 | 1000 | 100 | $31 \times 10^4$ | 13.0 | 1.1 | 10 | 262 |
| Comparative Example 8 | 0 | 0 | 28 | $48 \times 10^4$ | 1.2 | 0.4 | 11 | 0 |

*1 Trimethylolpropane tris(3-mercaptopropionate)
*2 Pentaerythritol tetraquis(3-mercaptopropionate)
*3 Neopentenetetrayl tetraquis(2-mercaptoacetate)

What is claimed is:

1. A styrene-based polymer having a branching nucleus represented by the general formula:

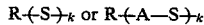

wherein R is an alkyl radical having 1 to 10 carbon atoms or an aryl radical having 6 to 10 carbon atoms, A is an organic radical, S is a sulfur atom, and k is 3 or 4, provided all of three or four of —S or —A—S are bonded to R, and having a sulfur content of 6 to 550 ppm, a weight average molecular weight of 450,000 to 1,300,000, and a weight average molecular weight/number average molecular weight (Mw/Mn) ratio of 2 to 15.

2. The styrene-based polymer as claimed in claim 1, having a schematic structural formula:

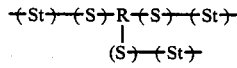

or

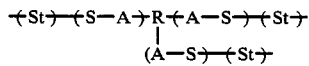

wherein St represents a styrene-based polymer unit.

3. The styrene-based polymer as claimed in claim 1, having a schematic structural formula:

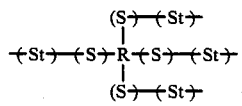

or

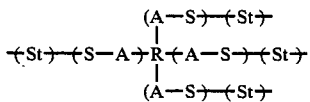

wherein St represents a styrene-based polymer unit.

4. The styrene-based polymer as claimed in claim 2 or 3 wherein the styrene-based polymer unit is a homopolymer of a styrene-based monomer or a copolymer of styrene-based monomers, or a copolymer of a styrene-based monomer and another monomer copolymerizable therewith.

5. The styrene-based polymer as claimed in claim 2 or 3 wherein said styrene-based polymer has the formula $R(A-S)_k$ and A is an organic radial represented by the general formula:

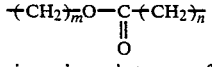

wherein m is an integer of 0 to 10, and n is an integer of 1 to 10.

6. A process for producing a styrene-based polymer having a branching nucleus represented by the general formula:

wherein R is an alkyl radical having 1 to 10 carbon atoms or an aryl radical having 6 to 10 carbon atoms, A is an organic radical, S is a sulfur atom, and k is 3 or 4, provided all of three or four of —S or —A—S are bonded to R, and having a sulfur content of 6 to 550 ppm, a weight average molecular weight of 450,000 to 1,300,000, and a weight average molecular weight/number average molecular weight (Mw/Mn) ratio of 2 to 15, which process comprises radical polymerizing a styrene-based monomer or a styrene-based monomer and another monomer copolymerizable therewith in the presence of 25 to 2,000 ppm based on the total weight of monomers used of a polyfunctional mercaptan compound represented by the general formula:

$$R(SH)_k \text{ or } R(A-SH)_k$$

until conversion reaches at least 40% by weight.

7. The process as claimed in claim 6 wherein the polyfunctional mercaptan compound is a four functional mercaptan compound selected from pentaerythritol tetraquis(2-mercaptoethanate), pentaerythritol tetraquis(3-mercaptopropionate), pentaerythritol tetraquis(4-mercaptobutanate), pentaerythritol tetraquis(5-mercaptopentanate), or pentaerythritol tetraquis(6-mercaptohexanate).

8. The process as claimed in claim 6 wherein the polyfunctional mercaptan compound is a three functional mercaptan compound selected from trimethylolpropane tris(2-mercaptoethanate), trimethylolpropane tris(3-mercaptopropionate), trimethylolpropane tris(4-mercaptobutanate), trimethylolpropane tris(5-mercaptopentanate), or trimethylolpropane tris(6-mercaptohexanate).

9. The process as claimed in claim 6 wherein the styrene-based polymer is copolymerizated with another copolymerizable monomer which is at least one monomer selected from acrylonitrile, methacrylonitrile, acrylic acid, methacrylic acid, methyl acrylate, m ethyl methacrylate, maleic anhydride, maleimide, or N-phenyl maleimide.

10. The styrene-based polymer as claimed in claim 1, having a weight average molecular weight of 500,000 to 1,200,000 and a weight average molecular weight/number average molecular weight (Mw/Mn) ratio of 2.5 to 13.

11. The process as claimed in claim 6 wherein said styrene-based polymer has a weight average molecular weight of 500,000 to 1,200,000 and a weight average molecular weight/number average molecular weight (Mw/Mn) ratio of 2.5 to 13.

12. The styrene-based polymer as claimed in claim 2 wherein said polymer has a sulfur content of 20 to 500 ppm, a weight average molecular weight of 500,000 to 1,200,000 and a weight average molecular weight/number average molecular weight ratio of 2.5 to 13.

13. The styrene-based polymer as claimed in claim 3 wherein said polymer has a sulfur content of 20 to 500 ppm, a weight average molecular weight of 500,000 to 1,200,000 and a weight average molecular weight/number average molecular weight ratio of 2.5 to 13.

14. The styrene-based polymer as claimed in claim 4 wherein said polymer has a sulfur content of 20 to 500 ppm, a weight average molecular weight of 500,000 to 1,200,000 and a weight average molecular weight/number average molecular weight ratio of 2.5 to 13.

15. The styrene-based polymer as claimed in claim 5 wherein said polymer has a sulfur content of 20 to 500 ppm, a weight average molecular weight of 500,000 to 1,200,000 and a weight average molecular weight/number average molecular weight ratio of 2.5 to 13.

16. The styrene-based polymer as claimed in claim 1 which is formed by polymerizing styrene and pentaerythritol tetraquis(3-mercaptopropionate).

17. The styrene-based polymer as claimed in claims 12 or 13 which is formed by polymerizing styrene and pentaerythritol tetraquis(3-mercaptopropionate).

18. The styrene-based polymer as claimed in claim 1 which is formed by polymerizing styrene and trimethylolpropane tris(3-mercaptopropionate).

19. The styrene-based polymer as claimed in claims 12 or 13 which is formed by polymerizing styrene and trimethylolpropane tris(3-mercaptopropionate).

20. The process as claimed in claim 7 wherein styrene is polymerized with said mercaptan compound.

21. The process as claimed in claim 8 wherein styrene is polymerized with said mercaptan compound.

22. The process as claimed in claim 7 wherein said polymer has a sulfur content of 20 to 500 ppm, a weight average molecular weight of 500,000 to 1,200,000 and a weight average molecular weight/number average molecular weight ratio of 2.5 to 13.

23. The process as claimed in claim 20 wherein said polymer has a sulfur content of 20 to 500 ppm, a weight average molecular weight of 500,000 to 1,200,000 and a weight average molecular weight/number average molecular weight ratio of 2.5 to 13.

24. The process as claimed in claim 21 wherein styrene-based polymer is formed by polymerizing styrene and pentaerythritol tetraquis(3-mercaptopropionate).

25. The process as claimed in claim 22 wherein styrene-based polymer is formed by polymerizing styrene and trimethylolpropane tris(3-mercaptopropionate).

* * * * *